No. 742,910.

Patented November 3, 1903.

UNITED STATES PATENT OFFICE.

ROBERT E. SCHMIDT, OF ELBERFELD, GERMANY, ASSIGNOR TO FARBEN-FABRIKEN OF ELBERFELD CO., OF NEW YORK, N. Y., A CORPORATION OF NEW YORK.

PROCESS OF MAKING ANTHRAQUINONE ALPHA DISULFONIC ACIDS.

SPECIFICATION forming part of Letters Patent No. 742,910, dated November 3, 1903.

Application filed June 27, 1903. Serial No. 163,367. (No specimens.)

*To all whom it may concern:*

Be it known that I, ROBERT E. SCHMIDT, doctor of philosophy, chemist, (assignor to the FARBENFABRIKEN OF ELBERFELD COMPANY, of New York,) residing at Elberfeld, Germany, have invented a new and useful Improvement in Processes of Making Anthraquinone-Alpha-Disulfonic Acids; and I hereby declare the following to be a clear and exact description of my invention.

I have found a new process for the manufacture of the anthraquinone 1:5 and 1:8 disulfonic acids, which process consists in first treating anthraquinone or anthraquinone-alpha-sulfonic acid with fuming sulfuric acid in the presence of mercury or mercury compounds—such as mercurous or mercuric salts, mercurous or mercuric oxid, &c.—until a mixture of the two above-named disulfonic acids results and then separating these acids from each other.

In carrying out my invention practically I can proceed as follows, the parts being by weight: A finely-powdered mixture of one hundred parts of anthraquinone and one part of mercurous sulfate is mixed with two hundred parts of fuming sulfuric acid (44% $SO_3$) and the resulting mass is slowly heated. At about from 130° to 140° centigrade a reaction sets in. One must take care that the temperature does not exceed 150° to 160° centigrade. It is kept at this temperature until a test portion is soluble in water and until all sulfuric anhydrid may have totally or nearly disappeared. During the heating the 1:5 anthraquinone-disulfonic acid separates in the shape of quadratic plates. It is allowed to cool down to about 50° centigrade, the melt is mixed with seventy-five parts of sulfuric acid, (66° Baumé,) and the 1:5 anthraquinone-disulfonic acid is filtered off. It can be further purified by dissolving it in hot water and precipitating again in the shape of the potassium salt by the addition of potassium chlorid. Subsequently the filtered sulfuric-acid solution is run into water. The solution thus obtained is heated, and from this hot solution the potassium salt of 1:8 anthraquinone-disulfonic acid is precipitated in the shape of light-yellow needles by the addition of potassium chlorid.

Of course the separation of the two sulfonic acids can also be carried out by a fractional crystallization of their salts.

The resulting 1:5 and 1:8 anthraquinone-disulfonic acids yield 1:5 and 1:8 diamido-anthraquinone or 1:5 and 1:8 symmetrical dimethyldiamidoanthraquinone on being heated with ammonia or with monomethylamin.

Having now described my invention and in what manner the same is to be performed, what I claim as new, and desire to secure by Letters Patent, is—

1. The new process for the production of the 1:5 and 1:8 anthraquinone-disulfonic acids, which process consists in first treating anthraquinone with fuming sulfuric acid in the presence of mercury until the disulfonation is completed, and then separating the two resulting disulfonic acids from each other, substantially as described.

2. The new process for the production of the 1:5 and 1:8 anthraquinone-disulfonic acids, which process consists in first treating anthraquinone-alpha-monosulfonic acid with fuming sulfuric acid in the presence of mercury until the disulfonation is completed, and then separating the two resulting disulfonic acids from each other, substantially as described.

3. The new process for the production of the 1:5 and 1:8 anthraquinone-disulfonic acids, which process consists in first treating anthraquinone with fuming sulfuric acid in the presence of mercury compounds until the disulfonation is completed, and then separating the two resulting disulfonic acids from each other, substantially as described.

4. The new process for the production of the 1:5 and 1:8 anthraquinone-disulfonic acids, which process consists in first treating anthraquinone-alpha-monosulfonic acid with fuming sulfuric acid in the presence of mercury compounds until the disulfonation is completed, and then separating the two resulting disulfonic acids from each other, substantially as described.

In testimony whereof I have signed my name in the presence of two subscribing witnesses.

ROBERT E. SCHMIDT.

Witnesses:
 OTTO KÖNIG,
 J. A. RITTERSHAUS.